United States Patent [19]
Fujimoto

[11] Patent Number: 4,875,562
[45] Date of Patent: Oct. 24, 1989

[54] LOCK-UP DAMPER FOR TORQUE CONVERTER

[75] Inventor: Shinji Fujimoto, Neyagawa, Japan

[73] Assignee: Kabushiki Kaisha Daikin Seisakusho, Osaka, Japan

[21] Appl. No.: 149,305

[22] Filed: Jan. 28, 1988

[30] Foreign Application Priority Data

Feb. 16, 1987 [JP] Japan ............................. 62-21649[U]

[51] Int. Cl.⁴ ........................ F16D 3/50; F16H 45/02
[52] U.S. Cl. .................................. 192/3.28; 192/106.2
[58] Field of Search ...................... 192/3.28, 3.29, 3.3, 192/3.31, 30 V, 106.2; 464/62, 66, 67

[56] References Cited

U.S. PATENT DOCUMENTS

| | | | |
|---|---|---|---|
| 4,138,003 | 2/1979 | Malloy | 192/3.29 |
| 4,240,532 | 12/1980 | Blomquist | 192/3.28 |
| 4,274,519 | 6/1981 | Moroto et al. | 192/3.28 |
| 4,289,220 | 9/1981 | Onuma et al. | 192/3.3 |
| 4,437,551 | 3/1984 | Gimmler et al. | 192/3.28 |
| 4,512,449 | 4/1985 | Motomura et al. | 102/3.28 |
| 4,555,009 | 11/1985 | Habel et al. | 192/106.2 |
| 4,570,764 | 2/1986 | Nishimura | 192/3.29 |
| 4,646,886 | 3/1987 | Nishimura | 192/3.28 |

Primary Examiner—Rodney H. Bonck
Assistant Examiner—Richard M. Lorence
Attorney, Agent, or Firm—Armstrong, Nikaido, Marmelstein, Kubovcik & Murray

[57] ABSTRACT

A lock-up damper for a torque converter, wherein a retaining plate is fastened to a piston plate having a facing pressable to a housing, a torsion spring outside holder is formed on an outer peripheral end of the piston plate, an inside holder facing the outside holder from radially internal side is formed on an outer peripheral end of the retaining plate, and the torsion spring is held by the holder from both the radially external and internal sides.

4 Claims, 3 Drawing Sheets

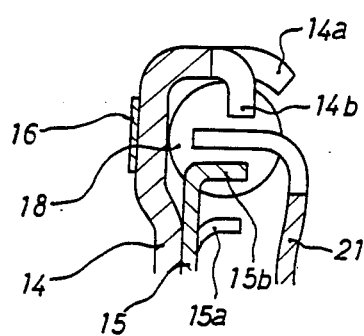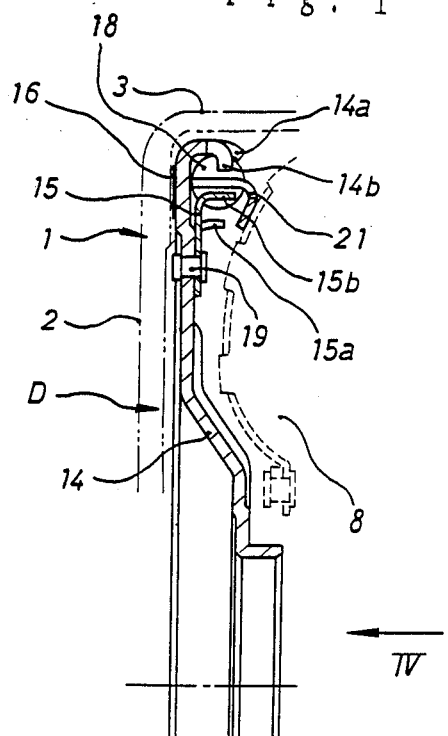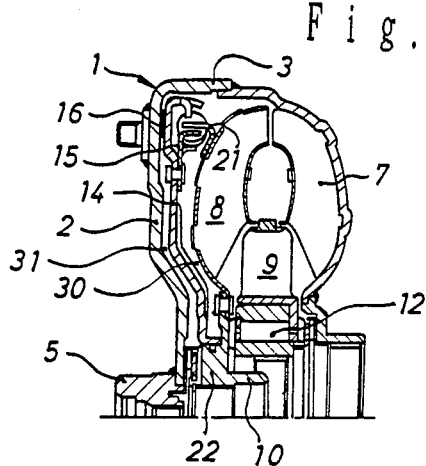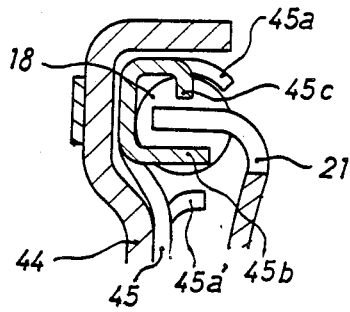

LOCK-UP DAMPER FOR TORQUE CONVERTER

BACKGROUND OF THE INVENTION

1. (Industrial Useful Field)

This invention relates to a direct coupled lock-up damper for use in a torque converter for an automobile.

2. (Prior Art)

Generally, direct coupled lock-up dampers are equipped with a piston plate which is pressable to a housing, and are interconnected to a turbine wheel through a torsion spring.

In the case of a torsion spring of the conventional damper such as in FIG. 6, a retaining plate 45 fastened to a piston plate 44 has both an outside holder 45a and an inside holder 45a'. A torsion spring 18 is held by outside holder 45a and inside holder 45a'. Projection 45b and projection 45c which mate with a rotation-direction end of the torsion spring 18 are formed only on the retaining plate, as illustrated by FIG. 6. The shape of the retaining plate 45 becomes complicated and difficult to manufacture. Moreover, the space for the torsion spring 18 is restricted so that allowances for design of diameter and positioning of the torsion spring 18 are small.

(Structure of the Invention)

In order to solve the above troubles, in this invention; a retaining plate is fastened to a piston plate having a facing pressable to a housing. A torsion spring outside holder is formed on an outer peripheral end of the piston plate. An inside holder facing the outside holder from the radially internal side is formed on an outer peripheral end of the retaining plate. The torsion spring is held by the inside and outside holders from the radially external and internal sides. Projections, mating with rotation-direction end of the torsion spring are formed on the outer peripheral ends of the plates, respectively. A driven plate of a turbine wheel is mated with one rotation-direction end of the torsion spring, and the torsion spring is freely compressible between said both projections.

BRIEF DESCRIPTION OF THE DRAWINGS

FIG. 1 is a vertical sectional view of a lock-up damper according to the invention (taken on a line I—I of FIG. 4).

FIG. 2 is an enlarged view of an essential part of FIG. 1.

FIG. 3 is a schematic sectional view of a torque converter equipped with the lock-up damper of FIG. 1.

FIG. 6 is an enlarged vertical sectional view of a conventional lock-up damper.

DETAILED DESCRIPTION OF THE INVENTION

(Embodiment 1)

Figure 4:
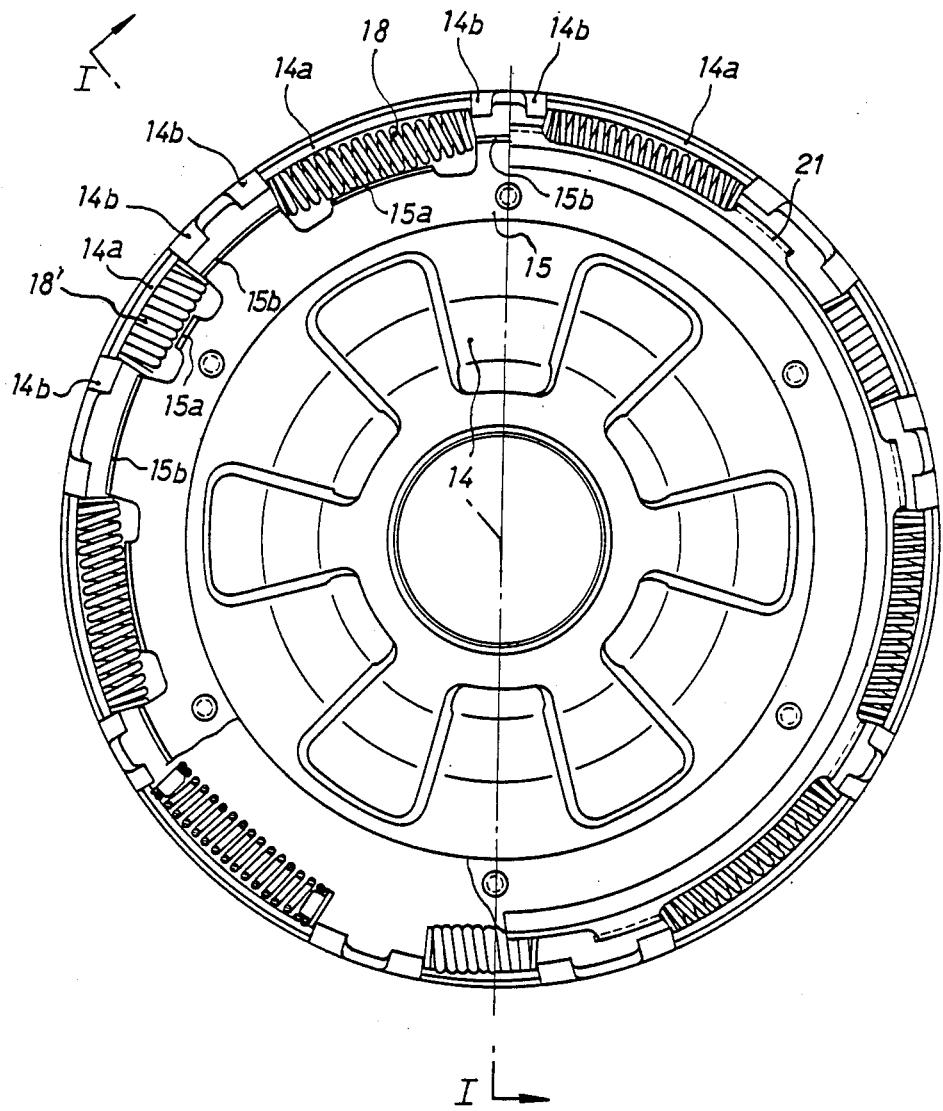
FIG. 4 is a front view viewed in a direction of arrow IV of FIG. 1.

FIG. 3 shows the schematic sectional view of a torque converter equipped with a lock-up damper according to the present invention. A housing 1 has a disc-like end wall 2 and a cylindrical peripheral wall 3. The end wall 2 is connected to an input shaft (or an enginer flywheel) 5, and a tip end of the peripheral wall 3 is connected to an outer peripheral end of a pump wheel 7. A turbine wheel 8 facing the pump wheel 7 is integrally connected to an output shaft 10, and a stator wheel 9 having a one-way clutch 12 is disposed between the turbine wheel 8 and the pump wheel 7.

A lock-up damper D is disposed between the housing end wall 2 and the turbine wheel 8, and an inner peripheral end portion of piston plate 14 of damper D fits onto an outer periphery of a cylindrical member 22 intergal with the turbine wheel 8 (output shaft 10) in a manner as movable freely in an axial direction on member 22. Oil chambers 30 and 31 are formed on opposite sides, respectively of the piston plate 14. The oil chamber 30 on the turbine wheel side of the damper D is interconnected to a hydraulic pump through a turbine chamber inside and a control valve. When a rotation speed ratio between the pump wheel 7 and the turbine wheel 8 gets near to approximately 1:1, pressure in the oil chamber 30 becomes higher than pressure in the oil chamber 31 so that the piston plate 14 moves toward the end wall 2 side due to a pressure difference between the chambers 30 and 31.

In FIG. 1 showing the vertical sectional view of the lock-up damper D, the damper D is composed of the piston plate 14, a retaining plate 15 and plural torsion springs 18. An annular facing 16, which faces the housing end wall 2 with a clearance left therebetween, is integrally provided on a housing end wall 2 side face of the piston plate 14. The retaining plate 15 is formed into an annular shape and at the same time fastened to a turbine wheel side face of the piston plate 14 by plural rivets 19.

In FIG. 2 showing the enlarged view of the outer peripheral end portion of the damper D, a torsion spring outside holder 14a bent into an L-shape toward the turbine wheel side approximately in parallel with the axial direction is formed on an outer peripheral end of the piston plate 14, and a projection 14b bent sectionally into an U-shape toward a radially internal side is also formed thereon. On the other hand, a torsion spring inside holder 15a bent toward the turbine wheel side in parallel with the axial direction and a projection 15b are formed on an outer peripheral end of the retaining plate 15. The projection 15b is situated at a position radially outer than the holder 15a. A driven plate 21 enters between the both projections 14b and 15b and is adapted to freely contact with a rotation-direction end of the torsion spring 18.

In FIG. 4 viewed in the direction of arrow IV of FIG. 1, the outside holder 14a is formed at plural places with spaces left therebetween in a circumferential direction, the inside holder 15a is formed at plural places corresponding to the outside holders 14a, and external and internal sides of the torsion springs 18 are held by the both holders 14a and 15a in a manner as movable in the rotation direction. The both projections 14b and 15b are formed between the torsion springs 18 to contact with or face rotation-direction ends of the torsion springs.

(Function of the Invention)

Function will be described hereunder. In FIG. 3, a torque transmitted from the input shaft 5 to the housing 1 is transmitted from the pump wheel 7 through an inside working oil to the turbine wheel 8, and further from the turbine wheel 8 to the output shaft 10.

When the speed ratio between the turbine wheel 8 and the pump wheel 7 gets near to 1:1, a pressure difference is produced between the oil chambers 30 and 31 to cause the piston plate 14 to move toward the end wall 2 side to press the facing 16 toward the end wall 2. Thereby, the torque is transmitted directly from the end wall 2 to the turbine wheel 8. The torque is transmitted from the both projections 14b and 15b of the piston plate 14 and the retaining plate 15 of FIG. 2 through the torsion spring 18 to the driven plate 21, and further from the turbine wheel 8 of FIG. 3 to the output shaft 10.

In this instance of torque transmission, the torsion spring 18 is compressed between the projections 14b and 15b and the driven plate 21 so that piston plate 14 and the retaining plate 15 are twisted relatively to the driven plate, thereby torque vibration cna be absorbed.

(Other embodiments)

Figure 5:
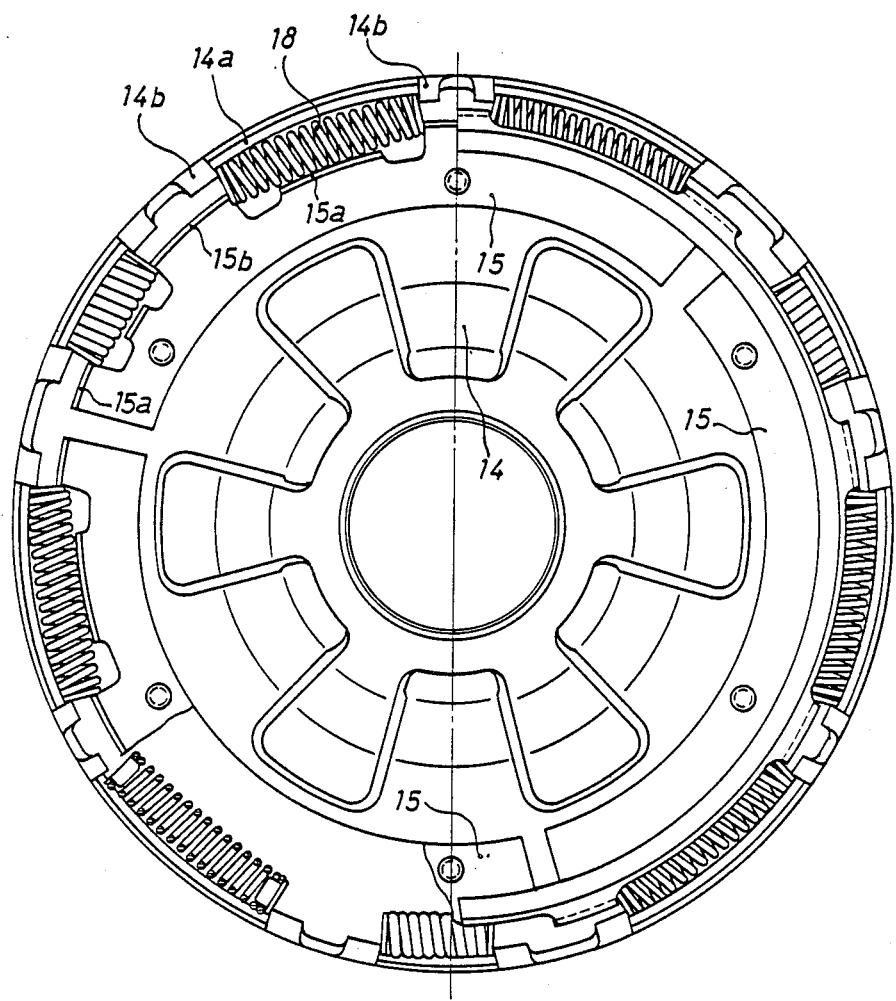
FIG. 5 is a front view of another embodiment.

An embodiment shown in FIG. 5 is one in which the retaining plate 15 is divided into three circular pieces.

According to this embodiment, reduction in material cost and improvement in machinability in manufacture can be accomplished.

(Effect of the Invention)

As described above, the present invention includes the following advantages.

(1) The external side of the torsion spring 18 is held by the outside holder 14a of the piston plate 14 and the internal side thereof is held by the inside holder 15a of the retaining plate 15, so that a considerable large disposal space for the torsion spring 18 can be secured as compared with the conventional structure wherein the torsion spring 18 is held only by the retaining plate, as illustrated in FIG. 6. Consequently, it becomes possible to enlarge a diameter of the spring 18, so that a large torsional torque can be absorbed. Namely, a large allowance for setting a torsion characteristic becomes obtainable and a range of applicability of the damper can be widened.

(2) The shape of outer peripheral end of the retaining plate 15 can be simplified as compared with conventional one so that a reduction in manufacturing cost can be accomplished.

(3) A fairly large disposal space of the torsion spring 18 can be secured so that the torsion spring 18 can be installed at a position radially outer than conventional one, thereby a large torsion angle can be obtained.

What is claimed is:

1. A lock-up damper for a torque converter having a turbine wheel, said lock-up damper being disposed between an input side housing of said torque converter and said turbine wheel, said lock-up damper having a retaining plate fastened to a piston plate of said lock-up damper, said piston plate having a facing pressable in an axial direction into engagement with said housing and having torsion springs, torsion spring outside holders formed on an outer peripheral end of said piston plate, torsion spring inside holders facing said outside holders from a radially internal side and formed on an outer peripheral end of said retaining plate, said torsion springs each being held by said outside and inside holders from the radially external and internal sides of said springs, projections mating with the rotational direction ends of said torsion springs formed on the outer peripheral ends of said retaining and piston plates, respectively, a driven plate of said turbine wheel mated with one rotation-direction end of said torsion springs, said torsion springs being freely compressible between said projections.

2. A lock-up damper for a torque converter as set forth in claim 1, in which said projection formed on said piston plate is shaped to protrude in a radially inside direction, and said projection formed on said retaining plate being shaped to extend substantially parallel with said axial direction.

3. A lock-up damper for a torque converter as set forth in any one of claim 1 or claim 2, in which said retaining plate is formed into an annular integral shaped.

4. A lock-up damper for a torque converter as set forth in any one of claims 1 or 2, in which said retaining plate is formed into an annular shape with three arcuate members.

* * * * *